United States Patent
Koop et al.

(10) Patent No.: US 10,811,667 B2
(45) Date of Patent: Oct. 20, 2020

(54) BATTERY TERMINAL

(71) Applicants: Johnson Controls Autobatterie GmbH & Co. KGaA, Hannover (DE); Johnson Controls Technology Company, Milwaukee, WI (US)

(72) Inventors: Michael J. Koop, Bielefeld (DE); Donald J. Caldwell, Milwaukee, WI (US); Jason D. Fuhr, Sussex, WI (US); Jeffrey L. Troxel, Menomonee Falls, WI (US)

(73) Assignees: Clarios Germany GmbH & Co. KGAA, Hannover (DE); CPS Technology Holdings LLC, New York, NY (US)

( * ) Notice: Subject to any disclaimer, the term of this patent is extended or adjusted under 35 U.S.C. 154(b) by 0 days.

(21) Appl. No.: 16/293,364

(22) Filed: Mar. 5, 2019

(65) Prior Publication Data
US 2019/0273241 A1    Sep. 5, 2019

Related U.S. Application Data

(60) Provisional application No. 62/638,665, filed on Mar. 5, 2018.

(51) Int. Cl.
*H01M 2/32* (2006.01)
*H01M 2/30* (2006.01)
*H01M 10/06* (2006.01)

(52) U.S. Cl.
CPC ............. *H01M 2/32* (2013.01); *H01M 2/307* (2013.01); *H01M 10/06* (2013.01); *H01M 2220/20* (2013.01)

(58) Field of Classification Search
CPC .......... H01M 2/30; H01M 2/32; H01M 2/305
See application file for complete search history.

(56) References Cited

U.S. PATENT DOCUMENTS

| 1,759,043 | A |   | 5/1930  | Derby |
|-----------|---|---|---------|-------|
| 3,992,224 | A | * | 11/1976 | Fielding .................. H01M 2/06 29/623.5 |
| 4,062,613 | A |   | 12/1977 | Tritenne |
| 4,075,368 | A | * | 2/1978  | Salamon ................ H01M 2/06 429/161 |
| 4,455,059 | A |   | 6/1984  | Theiler |

(Continued)

FOREIGN PATENT DOCUMENTS

| CN | 104282871 B | 1/2015 |
|----|-------------|--------|
| EP | 1229596 A1  | 8/2002 |

(Continued)

OTHER PUBLICATIONS

Machine Translation of JPH08102314A (Jul. 17, 2019) (Year: 2019).*

(Continued)

*Primary Examiner* — Matthew J Merkling
(74) *Attorney, Agent, or Firm* — Boardman & Clark LLP

(57) ABSTRACT

Disclosed is a battery having a conductive terminal extending beyond a surface of a battery cover, the conductive terminal having an internal portion and an external surface, wherein the internal portion comprises lead and external surface comprises a non-lead conductive material. Further disclosed is a method for producing such a battery.

16 Claims, 10 Drawing Sheets

(56) References Cited

U.S. PATENT DOCUMENTS

| | | | |
|---|---|---|---|
| 4,523,068 A * | 6/1985 | Lund | H01M 2/307 156/379.6 |
| 4,898,796 A | 2/1990 | Furukawa et al. | |
| 5,326,655 A | 7/1994 | Mix et al. | |
| 5,709,967 A * | 1/1998 | Larsen | H01M 2/0434 29/623.2 |
| 5,905,002 A | 5/1999 | Lund et al. | |
| 5,931,690 A | 8/1999 | Sai et al. | |
| 6,001,506 A * | 12/1999 | Timmons | H01M 10/14 429/121 |
| 6,152,785 A | 11/2000 | Haller et al. | |
| 6,342,680 B1 * | 1/2002 | Nakagawa | B29C 45/0013 174/257 |
| 6,492,060 B1 * | 12/2002 | Timmons | H01M 2/305 429/121 |
| 7,052,322 B2 | 5/2006 | Heller et al. | |
| 7,052,332 B2 | 5/2006 | Heller et al. | |
| 7,074,095 B2 | 7/2006 | Perng | |
| 7,429,199 B2 | 9/2008 | Burgess | |
| 7,997,942 B2 | 8/2011 | Dowman | |
| 10,211,445 B2 * | 2/2019 | Hasegawa | H01M 2/024 |
| 2001/0033171 A1 * | 10/2001 | Batson | G01R 1/203 324/426 |
| 2002/0114994 A1 * | 8/2002 | Yabuki | H01M 2/305 429/178 |
| 2002/0119370 A1 * | 8/2002 | Ayres | C09D 183/04 429/178 |
| 2002/0180405 A1 * | 12/2002 | Batson | H02J 7/0047 320/128 |
| 2004/0079738 A1 * | 4/2004 | Sakamoto | H01M 2/307 219/121.82 |
| 2005/0084751 A1 * | 4/2005 | Ratte | B22D 19/00 429/182 |
| 2011/0039153 A1 * | 2/2011 | Nakayama | H01M 2/043 429/181 |
| 2012/0225331 A1 | 9/2012 | Tartaglia | |
| 2013/0143090 A1 * | 6/2013 | Hosoya | H01M 10/0587 429/94 |
| 2013/0323591 A1 * | 12/2013 | Woehrle | C25D 7/00 429/211 |
| 2019/0273242 A1 | 9/2019 | Jaeppelt et al. | |

FOREIGN PATENT DOCUMENTS

| | | | | |
|---|---|---|---|---|
| GB | 2191331 A | | 12/1987 | |
| JP | 63175335 A | * | 7/1988 | H01M 2/307 |
| JP | 08102314 | | 4/1996 | |
| JP | 08102314 A | * | 4/1996 | |
| JP | 09045309 | | 2/1997 | |
| JP | 09045309 A | * | 2/1997 | H01M 2/307 |
| JP | 63175335 | | 7/1998 | |
| JP | 10321199 | | 12/1998 | |
| JP | 10321199 A | * | 12/1998 | H01M 2/307 |
| WO | 9821765 A1 | | 5/1998 | |

OTHER PUBLICATIONS

International Search Report and Written Opinion of the International Searching Authority dated May 14, 2019, for PCT/US2019/020792 filed Mar. 5, 2019, 15 pgs.

odyssey.battery.com/batteries/designadvantages, printed web pages captured Feb. 24, 2020, 3 pages.

* cited by examiner

BATTERY TERMINAL

CROSS-REFERENCE TO RELATED APPLICATIONS

This application claims the benefit of U.S. Provisional Patent Application, Ser. No. 62/638,665 filed Mar. 5, 2018, entitled, BATTERY TERMINAL, the entire contents of which is hereby incorporated by reference in its entirety.

FIELD OF INVENTION

The present disclosure relates to batteries. The present disclosure more specifically relates to batteries and external electrical connections for batteries.

BACKGROUND

In batteries with multiple cell elements, the cells are connected in series by conductive straps. The straps also connect the cells to a positive terminal and a negative terminal. These terminals are accessible outside the battery housing. These terminals allow for a vehicle (or other application) to connect to the battery for use. The conductive straps and terminals comprise a conductive material. Typically, in a lead-acid battery, this conductive material is comprised of lead.

Lead is a heavy metal and considered to be toxic. Any lead surface exposed to the environment is a potential source of contamination. Use of lead is therefore prohibited in many applications.

Known lead-acid batteries require interaction between a consumer or technician with the lead terminals in order to connect, change, or otherwise maintain the battery. Certain governmental bodies are advancing tighter regulation of lead in lead-acid batteries. For example, the European Union and the State of California have explored regulations about lead exposure as it relates to lead-acid batteries. For example, Department of Toxic Substances Control's (DTSC) in California is actively evaluating whether it should identify lead-acid batteries as a Priority Product under the Safer Consumer Products (SCP) program. Of particular concern is the exposure of consumers to lead dust by inhalation and ingestion during consumer use and replacement.

SUMMARY

Therefore, various embodiments of solutions are disclosed which would allow for access to the functionality of the battery without requiring a user to interact with the lead. The present invention according to various embodiments relates to a lead acid battery having a positive terminal and a negative terminal. The positive and negative terminals may be designed, according to various embodiments of the invention, to limit exposure to lead provided in the terminal. In other words, the disclosed invention may allow for exposed surfaces of the battery to be free of lead.

Providing a non-lead terminal interface may result in reduced consumer and environmental lead exposure. A system which may allow for no exposed lead on the battery could address concerns from governmental agencies as well as reduce risks to consumers and those interacting with batteries during use and replacement.

Various embodiments may likewise provide advantages for corrosion resistance on the battery terminal. Over time, standard lead terminals may corrode based on interaction of the lead with vehicle components, conducting electricity, and environmental factors. Corrosion may negatively impact battery performance. By allowing for a non-lead interface, such corrosion may be reduced or even eliminated.

Disclosed is a battery having one or more battery terminals, in various embodiments, which are coated in a conductive material that is not lead. Likewise disclosed is a battery having one or more battery terminals, in various embodiments, including a bushing having an external surface that is not lead. The disclosed battery, terminal, and method therefore allow for electrical and mechanical attachment of connectors to a non-lead terminal surface of a battery. This may prevent or limit exposure to lead by consumers and technicians who work with a battery.

Disclosed is a battery having a battery housing and a positive and negative terminal, the positive and negative terminal being accessible through the battery housing; wherein the positive and negative terminal further comprise a non-lead conductive surface on both the positive and negative terminal. Further disclosed is a battery wherein the non-lead conductive surface is a coating provided on the negative battery terminal and the positive battery terminal, the negative battery terminal and the positive battery terminal each comprising lead.

Further disclosed is a battery wherein the non-lead conductive surface is a coating provided on the sides of a bushing comprising lead. Further disclosed is a battery wherein a top surface of the positive battery terminal and negative battery terminal comprises a conductive coating. Further disclosed is a battery wherein the non-lead conductive surface is selected from a group comprising tin, zinc, brass, copper, stainless steel, nickel, and alloys thereof. Further disclosed is a battery wherein the non-lead conductive surface is an arc-sprayed conductive surface comprising zinc or tin. Further disclosed is a battery wherein the positive terminal or negative terminal comprises a bushing having a concave depression. Further disclosed is a battery wherein the positive terminal or negative terminal comprises a non-lead material filling the concave depression. Further disclosed is a battery wherein the non-lead material comprises an epoxy or resin.

Disclosed is a battery having a conductive terminal extending beyond a surface of a battery cover, the conductive terminal having an internal portion and an external surface, wherein the internal portion comprises lead and external surface comprises a non-lead conductive material. Further disclosed is a battery wherein the non-lead conductive surface is selected from a group comprising zinc, tin, brass, copper, stainless steel, nickel, and alloys thereof. Further disclosed is a battery wherein the non-lead conductive surface is an arc-sprayed surface. Further disclosed is a battery wherein the arc-sprayed surface comprises zinc or tin. Further disclosed is a battery wherein the terminal comprises a bushing having a concave depression. Further disclosed is a battery wherein the positive terminal or negative terminal comprises a non-lead material filling the concave depression.

Disclosed is a method for producing a battery having a non-lead surface comprising coating a battery terminal with a non-lead coating. Further disclosed is a method for producing a battery wherein coating a battery terminal with a non-lead coating further comprises coating a bushing with a non-lead coating and providing the bushing into a battery housing. Further disclosed is a method for producing a battery further comprising: sealing an exposed top surface of the battery terminal using a further non-lead coating. Further disclosed is a method for producing a battery wherein coating a battery terminal with a non-lead coating is performed using an arc-spraying process after post welding.

These and other features and advantages of various embodiments of systems and methods according to this invention are described in, or are apparent from, the following detailed description of various exemplary embodiments of various devices, structures, and/or methods according to this invention.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

Disclosed are various embodiments of a battery, battery terminal, and method for manufacturing the same. The disclosed embodiments of a battery, battery terminal, and method may allow for access to the terminal and battery without exposure to lead on the surface of the terminal.

Figure 1:
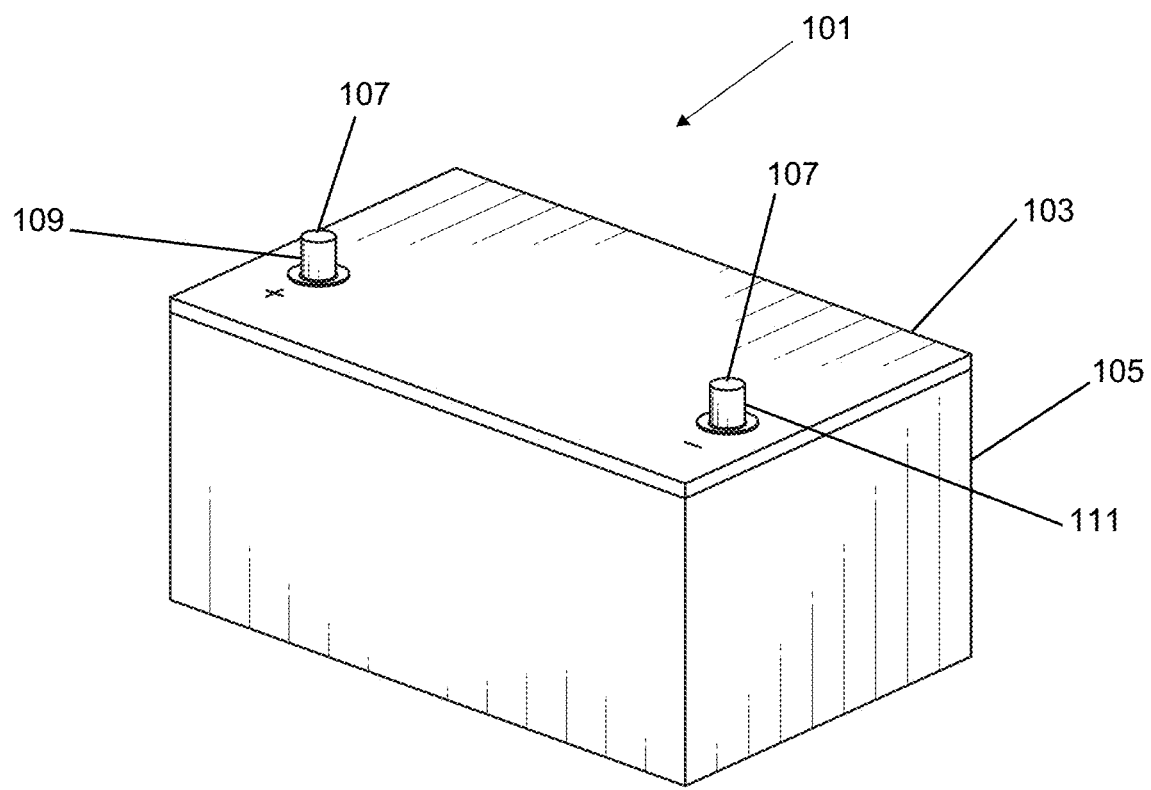
FIG. 1 shows a battery having two terminals, according to various embodiments.

FIG. 1 shows a battery 101 having a housing 105. The housing 105 may further comprise a surface 103 (for example, a cover or lid). Protruding from the surface 103 can be seen two terminals 107. While terminals 107 are generally specified, the terminals 107 may comprise a positive terminal 109 or a negative terminal 111 (the phrase "terminal" may be used herein to describe a positive terminal 109, negative terminal 111 or both unless otherwise particularly specified). While the cover 103 is shown on a top of the battery 101 with the terminals 107 protruding towards an upper edge of the page, it should be understood the cover 103 and terminals 107 may be provided on any orientation, such as a side to allow access to terminals 107.

The various elements of the battery 101, the battery housing 105, the battery cover 103, and the cell containers may be made of a wide variety of known materials. For example, the cover 103, container/housing 105, and/or various components may be made of any polymeric (e.g., polyethylene, polypropylene, a polypropylene containing material, etc.) or composite (e.g., glass-reinforced polymer) material. For example, the container may be made of polypropylene-containing material (e.g., pure polypropylene, co-polymers comprising polypropylene, polypropylene with additives, etc.). Such polymeric material is relatively resistant to degradation caused by acid (e.g., sulfuric acid) provided within cells of the container or housing 105.

Figure 2A:
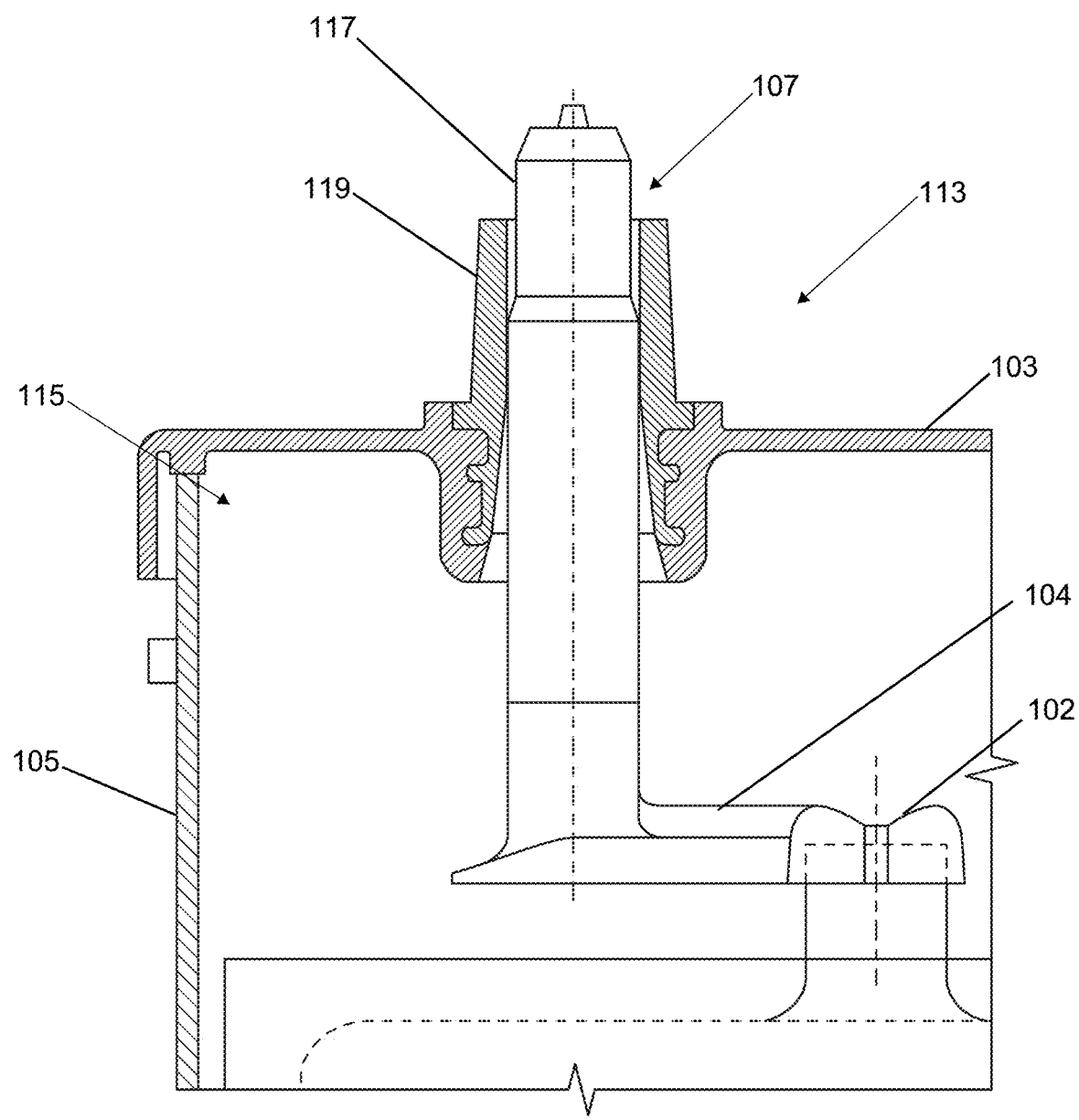
FIG. 2A shows a section of a battery having a known bushing and terminal, according to various embodiments.

FIG. 2A shows an example of a section of a battery 101. The battery 101 includes an internal portion 115 which may comprise a battery element 102 coupled to an end strap 104 which leads to a terminal post 117. The terminal post 117 extends through a bushing 119 provided within the cover 103 of the battery housing 105. This is one non-limiting example of a battery 101 which may be used with the devices (e.g. bushing, post, and/or cover), systems, and methods described herein.

Figure 2B:
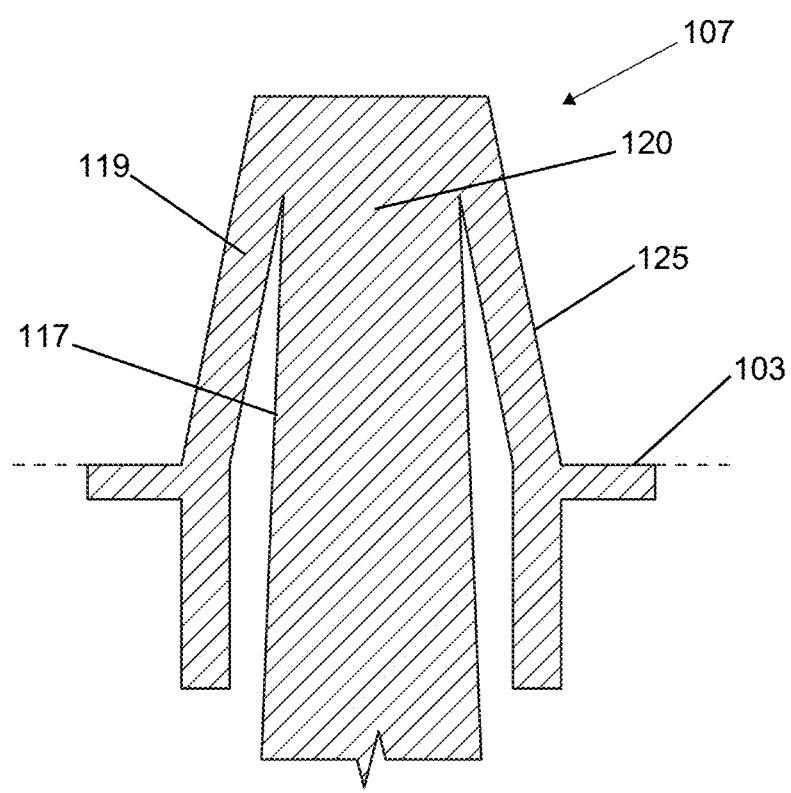
FIG. 2B shows a cross-section of a battery terminal after welding, according to various embodiments.

FIG. 2B shows an example battery terminal 107 after welding. The figure more specifically shows a cross-section of a battery terminal 107, according to various embodiments. The terminal post 117 is provided inside of the terminal bushing 119. Together (terminal post 117 and terminal bushing 119) they form a battery terminal 107 for connection to a battery 101 which protrudes through a surface or cover 103. Known battery terminals are constructed of lead. The disclosed terminal (terminal post and terminal bushing) likewise may be formed of lead, however, exposed surfaces of the terminal may be covered to prevent exposure of the lead as described further herein.

The terminal posts 117, bushing 119, terminals 107, weld 120, and connection members, may be made of one or more conductive materials (e.g., lead or a material containing lead). Likewise, the strap members and end straps 104 may be made of one or more conductive materials (e.g., lead or a material containing lead).

The terminals 107 may be comprised, in various embodiments, of a lead alloy. In various embodiments, this alloy may be a substantially pure lead and may, in various embodiments, include lead, tin, antimony, calcium, and combinations thereof. The alloy may, as a non-limiting example, be a lead tin alloy with a tin composition range of 1-4%, 1-2.25%, 1-1.5%, and the like. The lead may be virgin lead or high purity lead or highly purified secondary lead, in various examples of embodiments. In turn, in known battery terminals 107, an exposed surface 125 may therefore as well be comprised of lead or lead alloy.

FIGS. 3A-5B comprise various embodiments of solutions for preventing exposure of lead on an outer surface of a battery 101. In various embodiments, this may comprise covering all exposed surfaces 125 (for example, an outside surface of the bushing 119 or terminal post 117 provided exterior to the housing (for example, exterior to a surface of the cover 103 or housing 105). In one or more embodiments the disclosed may comprise a conductive film coating (225, 325, 425) on an outer surface of the terminal (207, 307, 407) (that is, above a battery housing cover (203, 303, 403). In various embodiments, the disclosed may comprise a relatively thin conductive film coating.

Figure 3A:
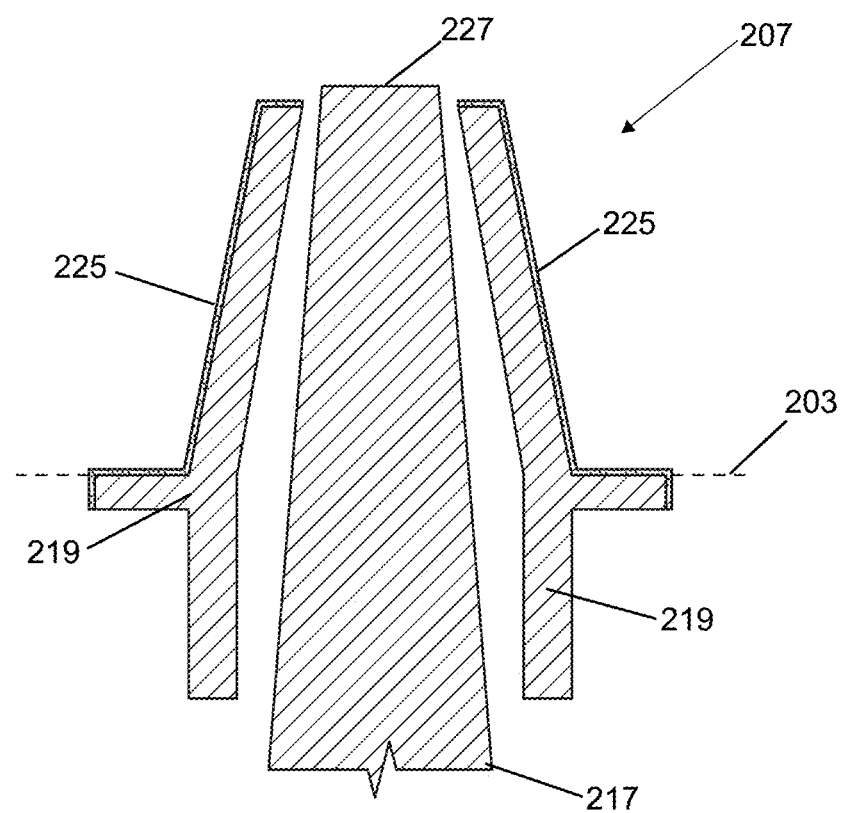
FIG. 3A shows a cross-section of a battery terminal of the type described herein before welding, according to various embodiments.

FIG. 3A shows a drawing of a terminal 207 before welding. As can be seen, a coating 225 is provided on the outside of the bushing 219. The bushing 219 may have a conductive coating 225 which may comprise tin while tin is provided other suitable conductive metal coatings (zinc, brass, copper, stainless steel, nickel, alloys, etc.) should be contemplated as within the scope of this disclosure. The coating 225 may be provided before the bushing 219 is placed into the battery housing cover 203. In the illustrated example, the terminal post 217 extends through the center of the bushing 219. It should be understood the bushing 219 is provided into a battery housing (for example, a cover 203) and the terminal post 217 extends through the terminal bushing 219.

Figure 3B:
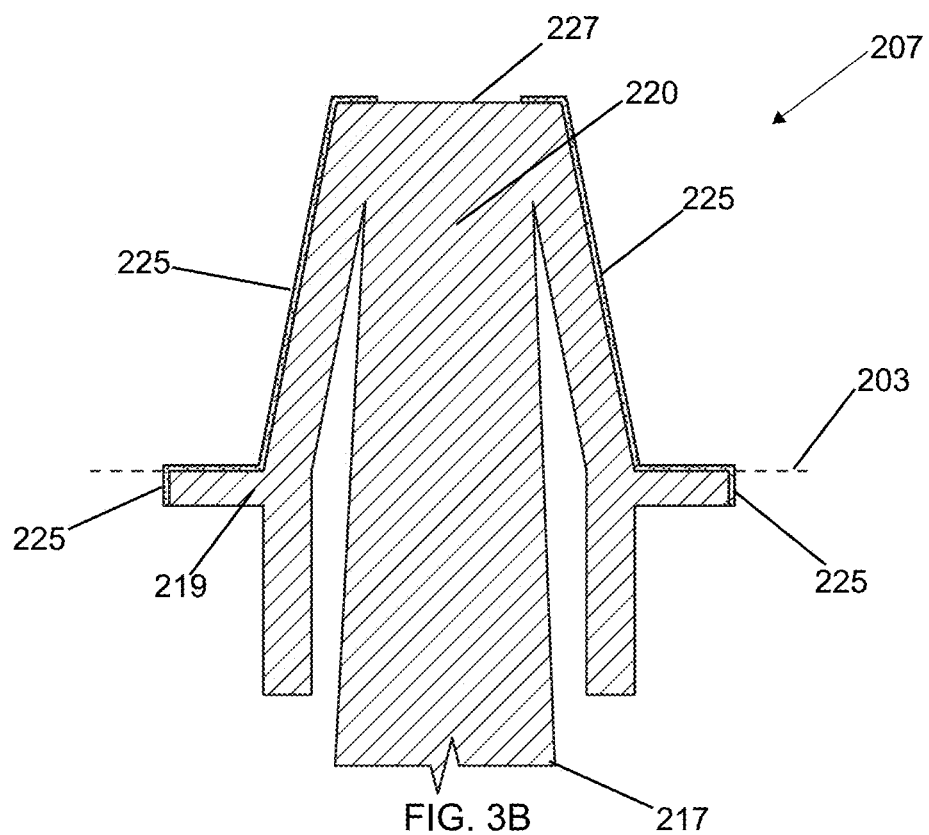
FIG. 3B shows a cross-section of the battery terminal of FIG. 4A after welding, according to various embodiments.

Next, the terminal 217 is welded to the bushing 219. In FIG. 3B, the terminal post 217 and terminal bushing 219 are shown after welding. The welding may be performed via a terminal post weld 220 which may use, in various embodiments, lead or a lead alloy. The terminal post weld 220 between the terminal post 217 and terminal bushing 219 can be seen towards the top in the illustrated example FIG. 3B. After welding, a cable may be connected to the terminal for use of the battery.

Figure 3C:
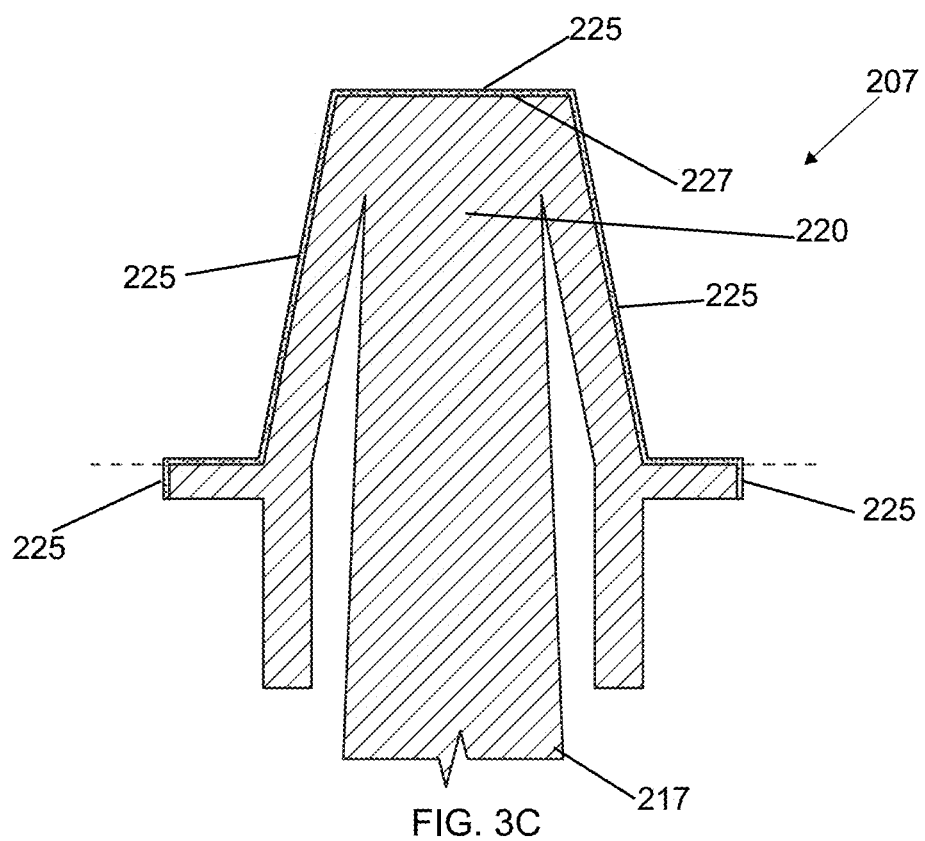
FIG. 3C shows a cross-section of the battery terminal of FIG. 4A after tinning or coating, according to various embodiments.

As described further herein, before or after welding the bushing 219 may have or allow for being provided with a coating 225 on the sides of the terminal 207. In various embodiments, coating 225 is solely provided on an upper portion of the terminal 207. In various alternative embodiments, coating 225 extends below a surface of the housing. The coating 225 on the bushing 219 below a surface of the housing may advantageously allow for ensuring no lead is exposed if a gap exists between the housing and bushing due to shrinkage. The coating 225 after welding may not be provided on a top surface 227 of the terminal 207. While the coating (e.g. tin or other conductive metal coating) 225 is provided on almost all of the exposed portion of the terminal 207, there is still a section of exposed lead at this stage (top surface 227). As shown in FIG. 3C, providing a coating 225, prior to or after battery formation, may allow for the coating 225 (for example, a thin film) to likewise cover the top of the terminal 207. Therefore, the disclosed terminal 207 may undergo an additional step for preventing exposure of lead.

As shown in FIG. 3C, the exposed section 227 may be covered in a tin or other conductive coating as well. The terminal 207 is then shown completely covered from external exposure to lead. In other words, the lead from bushing 219, terminal post 217, weld 220, etc. is encapsulated or provided only within the battery housing 105.

Various further examples of embodiments are shown in FIGS. 4A-4E. First, in FIGS. 4A-4C, a terminal post 317 is shown provided into a terminal bushing 319. Again, the figures are shown before welding. In one or more embodiments, the battery covers 303 are molded with the bushings 319 coated (plated) on the outside surface 325.

The bushings 319 may, in various embodiments, be provided with a counter bore where the inner diameter narrows and fuses to the terminal post. For example, turning to FIGS. 4B and 4C, the terminal bushing 319 may further comprise a concave depression 326 of uncoated lead. In various embodiments, the concave depression 326 may take various shapes, for example (but not limited to), an angled top (FIGS. 4B, 4D) 329 or stepped surface (FIG. 4C) 328. In various embodiments, the bushing is countersunk and not counter bored to allow a continuous top surface (FIG. 4A) 331. A coating, for example made of tin, in various embodiments, may be provided on the outside of the bushing (FIGS. 3A-3C, 4A-4E).

Figure 4A:
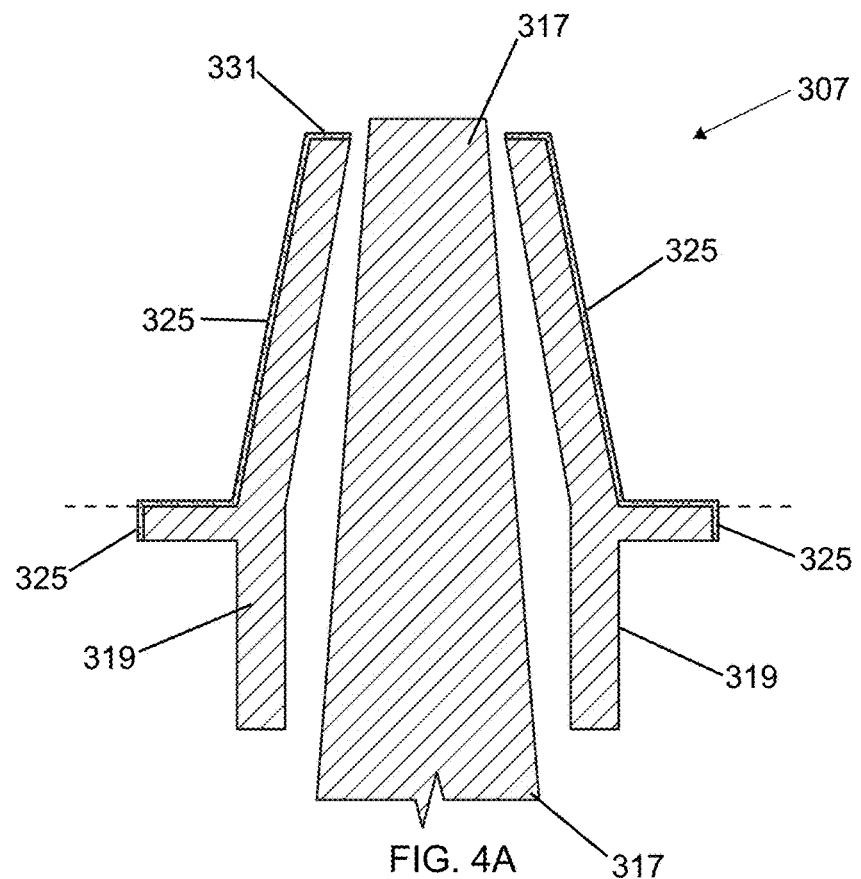
FIG. 4A shows a cross-section of a battery terminal of the type described herein before welding, according to various embodiments.
Figure 4B:
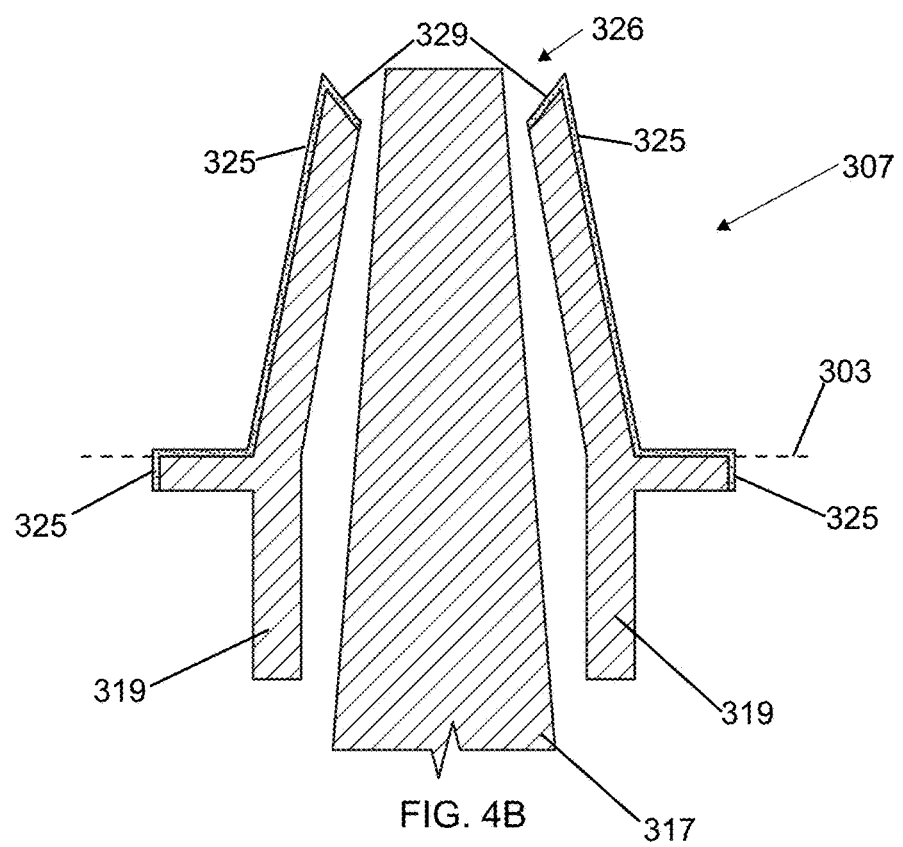
FIG. 4B shows a cross-section of a battery terminal of the type described herein before welding, according to various embodiments.
Figure 4C:
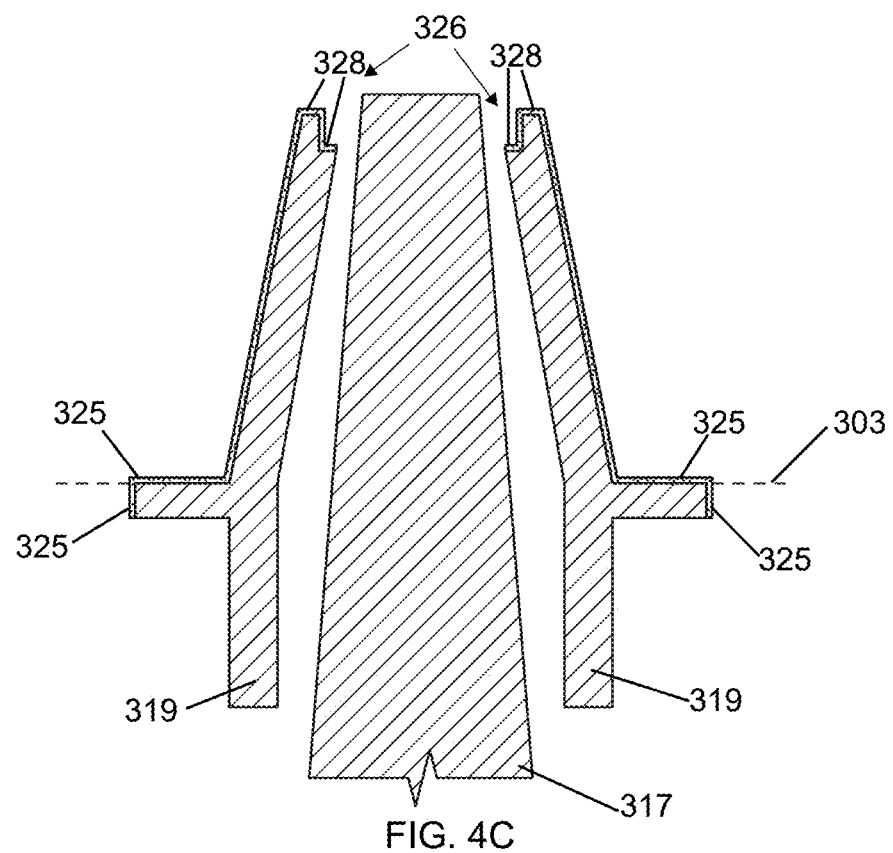
FIG. 4C shows a cross-section of a battery terminal of the type described herein before welding, according to various embodiments.
Figure 4D:
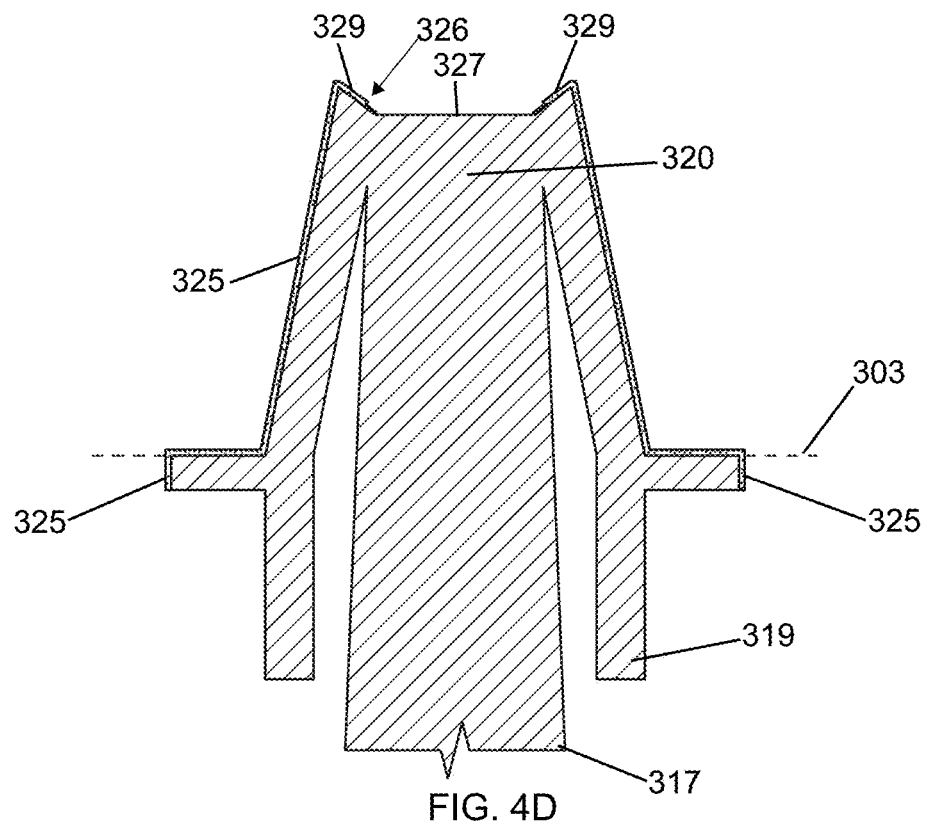
FIG. 4D shows a cross-section of a battery terminal of the type described herein after welding, according to various embodiments.

Next, in FIG. 4D, the terminal post 317 and terminal bushing 319 are welded (for example at terminal post weld 320). Again, while much of the terminal 307 is now coated in a non-lead surface 325, the top may still have exposed lead 327 (e.g. as shown in FIG. 3D). The terminal bushing 319 and terminal post 317 may be welded below the top surface 327 of the terminal bushing to leave a slight concave depression of exposed lead 327 below the top of the bushing.

Figure 4E:
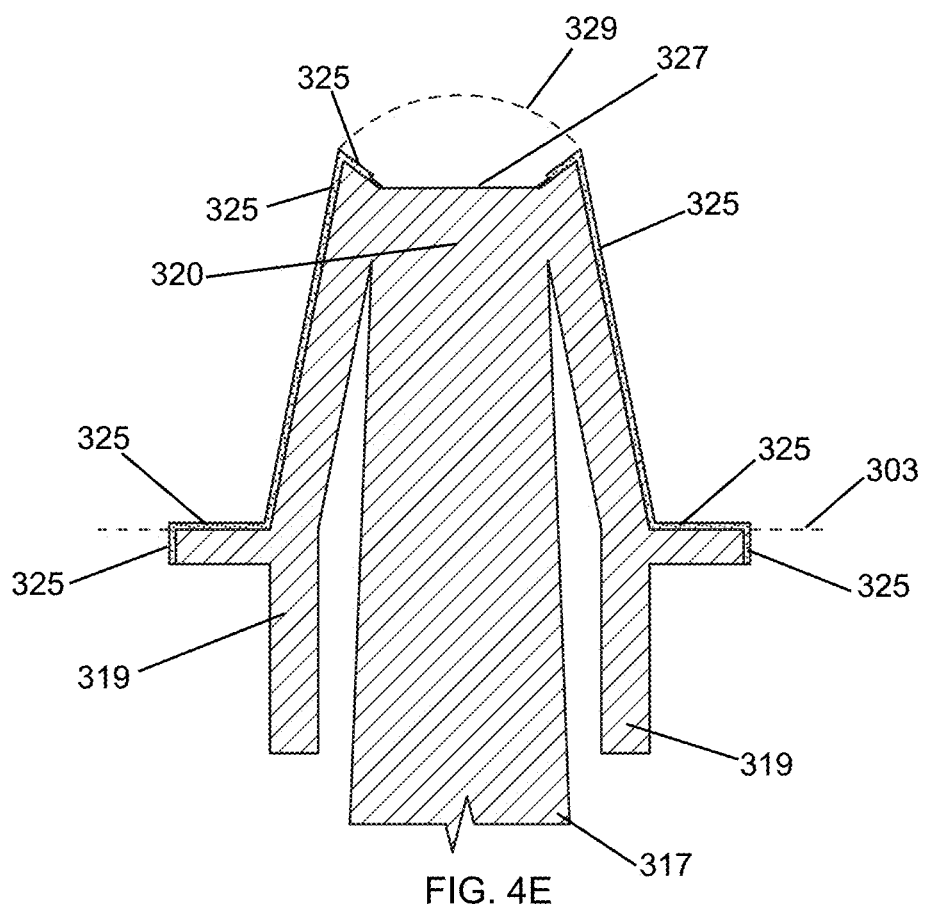
FIG. 4E shows a cross-section of a battery terminal of the type described herein after sealing, according to various embodiments.

In FIG. 4E, the exposed lead 327 is covered using a sealant (or other suitable material) in a sealing step which covers exposed lead 327 in a covering 329. For example, a sealant like epoxy or another material may be provided to coat the top exposed lead 327. In various embodiments, the epoxy or other material coating 329 covers the exposed lead 327 entirely. Where the exposed lead 327 comprises a depression, this may then be filled with a material (as non-limiting examples, an epoxy resin or other polymer with suitable adhesion characteristics). This material may be set with UV light, heat, or another method to set the coating 329.

The coating 329 on top of the terminal 327 may be applied before or after battery formation. The coating 329 on the top of the terminal may or may not be conducting.

Figure 5A:
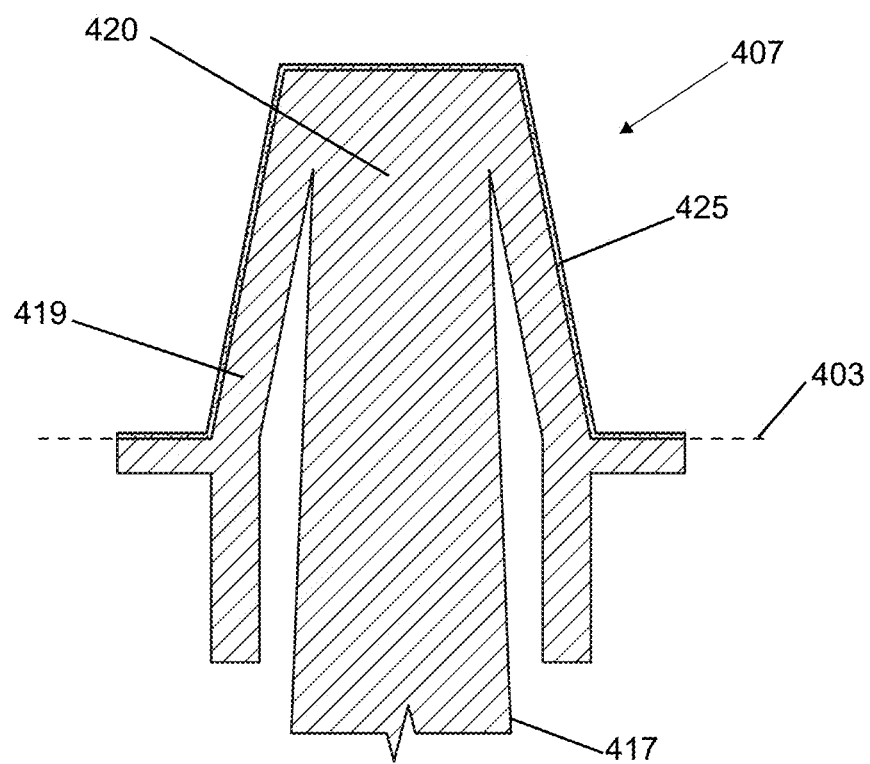
FIG. 5A shows a battery terminal having a conductive coating using a system and method described herein, according to various embodiments.
Figure 5B:
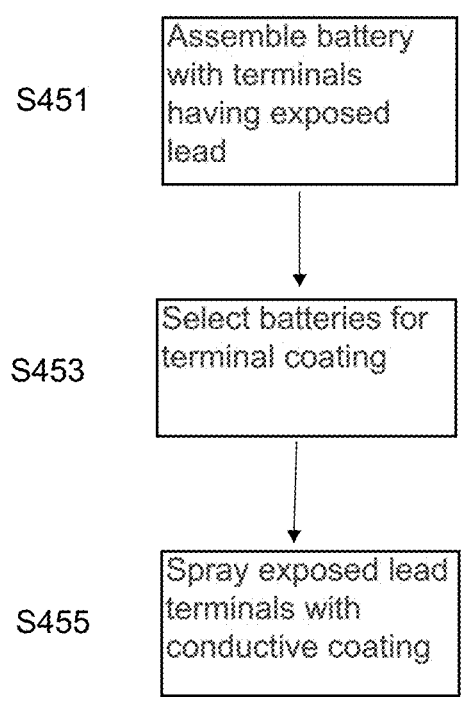
FIG. 5B shows a method for creating the terminal of FIG. 5A, according to various examples of embodiments.

FIGS. 5A-5B shows more examples of embodiments. FIG. 5A more specifically shows the surface of the terminal 407 after welding (again, welding joint 420 may be seen towards a top of the terminal 407) which connects the battery terminal post 417 to the bushing 419. A thin film 425 comprising a non-lead conductive material may be seen on an outside surface of the terminal 407. The film 425 in this embodiment may be applied after welding. Therefore the bushing 419 may not have the coating 425 below a surface of the cover 403.

FIG. 5B describes a method for producing the terminal of FIG. 5A. First, in step S451, a battery 101 is assembled with terminals 407 having exposed lead. Next, in step S453, a battery 101 may be selected for terminal coating. This may occur where, for example, batteries 101 are to be sent to a particular market where coating is necessary. Finally, in step S455, the terminals 407 having exposed lead may be sprayed with a conductive coating. Various methods may be used to spray the terminals 407 (i.e. positive terminal and negative terminal).

The terminals 407 may comprise a thermal sprayed surface (a surface coated using a thermal spraying technique such as, but not limited to, arc spraying). In particular, one or more of terminals 407 may comprise an arc-sprayed non-lead surface 425. In various embodiments, the arc-sprayed non-lead surface 425 may comprise zinc. While zinc is provided, other suitable conductive materials may be contemplated as within the scope of this disclosure (for example, but not limited to, tin or other nontoxic metal). The arc-sprayed non-lead surface 425 may be produced using an arc spray process. The arc-sprayed non-lead surface 425 may have certain advantages, such as but not limited to, corrosion resistance (particularly on a positive terminal 407). Additional advantages may comprise an enhanced bond between the coating (such as, but not limited to, zinc) 425 and lead of the bushing 419 and post 417 after welding. In various embodiments, the coating 425 may be relatively thin (for example, but not limited to, less than 1 mm or more particularly, approximately 0.5 mm). Coating or spraying to produce non-lead surface 425 after formation as part of the battery decoration process may allow for terminal protection to be applied only for a defined market. Coating/spraying to produce non-lead surface 425 after battery formation may reduce the possibility of degradation of the coating during the aggressive formation and washing process.

In various embodiments, terminals (207, 307, 407) which lack exposed lead may additionally comprise using one or more of the following or be produced by one or more additional coating techniques:

a. provide a spray coating of a suitable electrically-conducting paint coating on the terminals after formation;

b. provide a metal powder coating on the burned (welded) post and then melt with a plasma, laser, or other suitable process after battery formation;

c. spray on or metal powder coat the terminal bushings with tin or other suitable material prior to lid molding and powder coating (or other suitable process) the terminal top with the same metal after post welding;

d. tin coating the bushings before lid molding and tinning of the top of the terminal as part of the post welding process;

e. spray coating of a suitable electrically conducting coating (for example, paint, which may be comprised of a number of conductive metals as described herein) on the terminals after formation;

f. metal powder coating (which may be comprised of a number of conductive materials as described herein) the burned post then melting with a plasma (or laser) (or another suitable process) after battery formation;

g. spray-on or metal powder coating the terminal bushings with Tin (Sn) or another suitable metal prior to lid molding and powder coating (or another suitable process) the terminal top with the same metal after post welding;

h. tin coating the bushings before cover molding and tinning of the top of the terminal as part of the post welding process;

i. molded battery covers with tin plated bushings, which after welding leave a slight concave depression below the top of the terminal;

j. mold battery covers with bushings tin plated on the outside surface, with the bushings being designed with a counter bore in which the inner diameter of the current bushing narrows and is later fused to a cast-on strap (e.g. end strap) post (while a counter bore is described, angles, curvature, or other geometric feature may be contemplated as within the scope of this disclosure), the bushing being welded to the post to below the ID of the bushing post to leave a slight concave depression below the top of the bushing and the concave depression in the top of the terminal is filled with epoxy resin or other polymer with suitable adhesion robustness.

Various embodiments may be understood as represented in the figures and modifications thereon. Again, while tin is provided, other suitable conductive metal coatings (zinc, brass, copper, stainless steel, nickel, alloys thereof, etc.) should be contemplated as within the scope of this disclosure. It should also be understood the coating may affect the terminal width. Therefore, the outer diameter of the bushing and/or terminal may be adjusted to allow for thickness of conductive/metal coating.

While a "coating" may be referred to herein, it should be understood that a method wherein the surface of a terminal is otherwise provided in a non-lead material (plating, dipping, etc.) should be contemplated as within the scope of this disclosure.

The disclosed embodiments may have a number of advantages, including allowing for access to the battery terminals without exposing the technician, consumer, or other user to lead. In various embodiments, the disclosed terminals may maintain all lead within the battery with no external exposure to lead. In addition, the disclosed terminals may allow for advantages in the recycling process.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery having a battery housing and a positive and negative terminal, the positive and negative terminal being accessible through the battery housing; wherein the positive and negative terminal further comprise a lead-free conductive surface on both the positive and negative terminal, wherein the lead-free conductive surface is a coating provided on the sides of a bushing, the bushing comprising lead.

2. The battery of claim 1, wherein a top surface of the positive battery terminal and negative battery terminal comprises a conductive coating.

3. The battery of claim 1, wherein the lead-free conductive surface is selected from a group comprising tin, zinc, brass, copper, stainless steel, nickel, and alloys thereof.

4. The battery of claim 1, wherein the lead-free conductive surface is an arc-sprayed conductive surface comprising zinc or tin.

5. The battery of claim 1, wherein the positive terminal or negative terminal comprises a bushing having a concave depression.

6. A battery having a conductive terminal extending beyond a surface of a battery cover, the conductive terminal having an internal portion comprising a bushing and an external surface, wherein the internal portion comprises lead and external surface comprises a lead-free conductive coating provided on the sides of the bushing.

7. The battery of claim 6, wherein the lead-free conductive coating is selected from a group comprising zinc, tin, brass, copper, stainless steel, nickel, and alloys thereof.

8. The battery of claim 6, wherein the surface is an arc-sprayed surface.

9. The battery of claim 8, wherein the arc-sprayed surface comprises zinc or tin.

10. A method for producing a battery having a lead-free conductive surface comprising coating a battery terminal with a lead-free coating, wherein the lead-free conductive surface is a coating provided on the sides of a bushing, the bushing comprising lead.

11. The method of claim 10 wherein coating a battery terminal with a lead-free coating further comprises providing the bushing into a battery housing.

12. The method of claim 11 further comprising: sealing an exposed top surface of the battery terminal using a further lead-free coating.

13. The method of claim 10 wherein coating a battery terminal with a lead-free coating is performed using an arc-sprayed process after post welding.

14. The method of claim 10 wherein coating a battery terminal with a lead-free coating is performed after battery formation.

15. The battery of claim 1, wherein the positive and negative terminal have no exposed lead.

16. The battery of claim 6, wherein the conductive terminal comprises no exposed lead.

* * * * *